Figure 1:
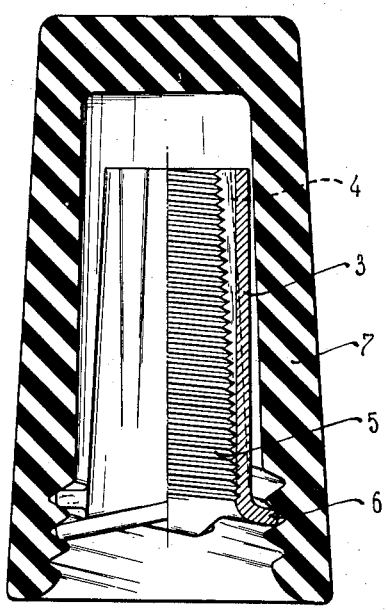

May 12, 1936.    C. H. JASPER    2,040,383
MEANS FOR JOINING ELECTRIC CURRENT CONDUCTORS
Filed April 27, 1935

Inventor:
Christiaan Hendrik Jasper
by
Atty.

Patented May 12, 1936

2,040,383

UNITED STATES PATENT OFFICE 2,040,383

MEANS FOR JOINING ELECTRIC CURRENT CONDUCTORS

Christiaan Hendrik Jasper, Rotterdam, Netherlands

Application April 27, 1935, Serial No. 18,592
In the Netherlands June 20, 1934

4 Claims. (Cl. 173—263)

The invention relates to means for joining electric current conductors of the type composed of a metal case or sleeve having a threaded tapering bore and of an insulating cap fitting on said case or sleeve.

In known wire connectors of this type, the sleeve is practically rigid with respect to the strains acting on the same when the connector is applied to the naked wire ends which, as a rule, are previously twisted to form a joint. Consequently, when a relatively small torque is applied, the wire ends forced into the sleeve will contact with the same through only a small axial portion of the inner sleeve wall, and when it is desired for the wire ends to contact with the said wall through a zone of appreciable axial length, an excessive torque is required.

It has already been proposed to meet said disadvantage by providing the sleeve with axially extending saw cuts, thus adapting the same to expand radially under the pressure of the wires forced thereinto. Abstracting from the fact that these cuts reduce the effective contact surface between sleeve and wires, the contact in such a sleeve will obviously be confined substantially to the narrow zone, where the joint formed by the twisted wire ends first engages the internal thread of the sleeve. Moreover, tapping screw thread in a conical bore offers particular difficulties.

The object of this invention is to improve a wire connector of the said type in such a manner that no excessive strains are required for causing the sleeve to intimately contact with the wire ends through a substantial portion of their length and, consequently, for reducing the intermediate resistance. With this object in view, it is suggested to provide the wall of the sleeve through at least part of its length with one or more folds or plaits extending in substantially axial direction and having a radial width which gradually decreases from the narrow towards the wide end of the sleeve.

If the naked ends of two or more wires, preferably after being twisted to form a point, are introduced into the sleeve through the wide opening thereof, and if the wires after engaging the internal screw thread are turned in the proper direction (or if the sleeve is turned relative to the wire ends), they will also perform a movement in axial direction owing to said thread biting into them. As a consequence, the wire ends will be forced in radial direction into intimate contact with the wall of the sleeve, and the pressure thus set up will tend to expand the sleeve, that is to say, to move the wall sections between the said folds or plaits a little away from one another. Owing to this expansion, the torque required for turning the wire ends and for moving them axially towards the narrow end of the sleeve need not be great. As a matter of course, the same will be greater or smaller according to the resistance offered by the elasticity of the material against expansion.

In accordance with the invention, therefore, the sleeve can be made by cutting an ordinary thin walled tube to the required length, providing this tube section with internal screw thread and thereafter folding or plaiting the sleeve wall lengthwise, in such a manner, that the radial width of the folds gradually decreases from the narrower to the wider opening of the sleeve.

Figure 2:
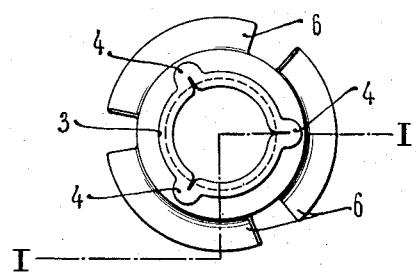

Reference is had to the annexed drawing, which illustrates, by way of example, a wire connector in accordance with the invention. On this drawing:

The left hand side half of Fig. 1 shows the insulating cap in axial section and the metal sleeve in elevation, whereas the right hand side half of Fig. 1 is an axial section along the line I—I in Fig. 2 of both the cap and the sleeve. Fig. 2 is a plan view of the sleeve only.

The drawing clearly shows that pressed into the sleeve 3, which originally was of cylindrical form and which is provided with female thread, there are three axial folds or plaits 4, the width or depth of which decreases from top to bottom. Owing to the provision of said folds, the inner space of the sleeve will taper from bottom to top. If the wall of the sleeve is very thin, the screw thread thereof could also be made by a pressing operation.

The folds 4 divide the wall of the sleeve in three cohering segments adapted to resiliently move away from one another under the action of radial pressure brought about on the inner wall of the sleeve by the twisted wire ends turned thereinto, whereby said segments will engage the said wire ends through a comparatively great axial length, without it being required for the wire ends to be excessively compressed.

The bottom edge of the illustrated sleeve 3 is formed by three helicoidal flange sections 6 of relatively steep pitch, by means of which the insulating cap 7 may be secured to the sleeve. Said helicoidal flange sections can be formed by a pressing operation, although the sleeve could also be provided in another manner with screw thread for securing the cap 7.

The term "conical bore" used in this specification and in the appended claims should be construed in the widest sense so as to include any bore the width of which decreases more or less gradually or stepwise from the one end of the sleeve to the other.

As to the insulating cap, this may have any suitable shape, provided always that it can perform its main function, i. e. protect the user from any danger of shock when manipulating the connector.

What I claim is:—

1. Means for joining electric current conductors, comprising a metallic sleeve having a conical bore with internal thread, the wall of said sleeve being provided, through at least part of its length, with a substantially axial fold or plait the radial width of which decreases from the narrower to the wider opening of the bore.

2. Means for joining electric current conductors, comprising a metallic sleeve having a conical bore with internal thread, the wall of said sleeve being provided, through at least part of its length, with a substantially axial fold or plait the radial width of which decreases from the narrower to the wider opening of the bore, and also comprising an insulating cap fitting on said sleeve.

3. Means for joining electric current conductors, comprising an internally threaded metallic sleeve having a conical bore extending therethrough, the wall of said sleeve being provided with a substantially longitudinally extending fold or plait, the radial width of which decreases in the direction from the narrower to the wider end of the bore, and supporting means substantially encompassing said sleeve, means at the wider end of said sleeve firmly engaging said supporting means, the remainder of said sleeve being arranged in spaced relationship relative to the supporting means, whereby said sleeve is adapted yieldingly to clamp an electric current conductor which may be threaded thereinto.

4. Means for joining electric current conductors, comprising an internally threaded metallic sleeve having a conical bore extending therethrough, the wall of said sleeve being provided with a plurality of circumferentially-spaced longitudinally extending expansible folds or plaits, whereby said wall is subdivided into a plurality of interconnected segments capable of movement toward or away from each other, the radial width of said folds or plaits decreasing in the direction from the narrower to the wider end of the bore, and an insulating cap substantially encompassing said sleeve, flange means at the wider end of said sleeve projecting from the latter into firm engagement with said cap, the remainder of said sleeve being arranged in spaced relationship relative to the cap, whereby said sleeve is adapted yieldingly to clamp an electric current conductor which may be threaded thereinto.

CHRISTIAAN HENDRIK JASPER.